United States Patent
Shu

(10) Patent No.: US 11,044,413 B2
(45) Date of Patent: Jun. 22, 2021

(54) LIGHT EMITTING APPARATUS AND IMAGE PICKUP APPARATUS USED FOR PHOTOGRAPHING, CONTROL METHODS THEREFOR, STORAGE MEDIA STORING CONTROL PROGRAMS THEREFOR, AND IMAGE PICKUP SYSTEM

(71) Applicant: CANON KABUSHIKI KAISHA, Tokyo (JP)

(72) Inventor: Takayuki Shu, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 51 days.

(21) Appl. No.: 16/448,061

(22) Filed: Jun. 21, 2019

(65) Prior Publication Data
US 2019/0394382 A1    Dec. 26, 2019

(30) Foreign Application Priority Data
Jun. 26, 2018    (JP) .............................. JP2018-121070

(51) Int. Cl.
*H04N 5/235*    (2006.01)
*H04N 5/225*    (2006.01)

(52) U.S. Cl.
CPC ......... *H04N 5/2354* (2013.01); *H04N 5/2256* (2013.01)

(58) Field of Classification Search
CPC ......... G03B 15/05; G03B 7/16; H04N 5/2354
See application file for complete search history.

(56) References Cited

U.S. PATENT DOCUMENTS

| | | | |
|---|---|---|---|
| 6,167,202 A * | 12/2000 | Fukui | G03B 7/17 396/157 |
| 7,697,837 B2 * | 4/2010 | Kosaka | G03B 15/05 396/164 |
| 2005/0168624 A1 | 8/2005 | Hasegawa | |
| 2005/0219381 A1 * | 10/2005 | Takeuchi | H04N 5/235 348/229.1 |

FOREIGN PATENT DOCUMENTS

| | | |
|---|---|---|
| CN | 103905724 A | 7/2014 |
| JP | 2005221641 A | 8/2005 |

OTHER PUBLICATIONS

Office Action issued in Chinese Appln. No. 201910554372.1 dated Feb. 20, 2021. English translation provided.

* cited by examiner

*Primary Examiner* — Noam Reisner
(74) *Attorney, Agent, or Firm* — Rossi, Kimms & McDowell LLP

(57) ABSTRACT

A light emitting apparatus that is capable of photographing a proper exposure image by utilizing light control performance of a flash at the maximum even in photographing under a minute flash emission amount. The light emitting apparatus is connected with an image pickup apparatus communicably. The light emitting apparatus includes a receiving unit and a sending unit. The receiving unit receives a request from the image pickup apparatus. The sending unit sends information about a first emission amount lower limit value that is settable by the image pickup apparatus as an emission amount lower limit value to the image pickup apparatus in a case where the receiving unit receives the request from the image pickup apparatus in a first emission mode in which light is emitted at a time of photographing with an emission amount set by the image pickup apparatus in a case where automatic light control is performed.

9 Claims, 6 Drawing Sheets

LIGHT EMITTING APPARATUS AND IMAGE PICKUP APPARATUS USED FOR PHOTOGRAPHING, CONTROL METHODS THEREFOR, STORAGE MEDIA STORING CONTROL PROGRAMS THEREFOR, AND IMAGE PICKUP SYSTEM

BACKGROUND OF THE INVENTION

Field of the Invention

The present invention relates to a light emitting apparatus, an image pickup apparatus, control methods therefor, storage media storing control programs therefor, and an image pickup system, and in particular, relates to a technique used for photographing that needs to keep a flash emission amount to a minute amount.

Description of the Related Art

There was a problem that overexposure tended to occur in photographing, such as short-distance photographing, that needs to keep an emission amount of a light emitting apparatus (a flash) to a minute amount. This is because light control to keep an emission amount to a minute amount is difficult for a light emitting apparatus.

FIG. 5A is a graph that shows a relationship between an emission instruction value from a camera and an emission amount of a flash.

A horizontal axis represents the emission instruction value shown by a relative light amount (EV) that is given from a camera to a light emitting apparatus.

The emission instruction value corresponding to an instruction to set the emission amount of the flash to 1/1 (full emission) shall be a reference value (0 EV). Moreover, the emission instruction value of −1 EV means the instruction to set the emission amount of the flash to ½ of the full emission, and the emission instruction value of −10 EV means the instruction to set the emission amount of the flash to 1/1024 of the full emission.

A vertical axis represents the actual emission amounts of flashes 1 and 2 shown by the relative light amount (EV) corresponding to the emission instruction value. Curves mean light control performances of the flashes 1 and 2. For example, as shown in FIG. 5A, when the emission instruction value of −10 EV is received from the camera, the flash 1 emits light with 1/1024 of the full emission. Hereinafter, an emission amount corresponding to the instruction shown by the emission instruction value is referred to as an ideal emission amount.

FIG. 5B is a graph showing deviations of the actual emission amounts of the flashes 1 and 2 from the ideal emission amount corresponding to the emission instruction value from the camera.

As shown in FIG. 5B, a difference from the ideal emission amount becomes large in a range where the emission instruction value is less than −10 EV for the flash 1 and in a range where the emission instruction value is less than −13 EV for the flash 2. That is, suitable light control becomes impossible. More specifically, the actual emission amount becomes more than the ideal emission amount within the above-mentioned ranges. That is, the flashes 1 and 2 emit light more brightly than the instructed illuminance.

That is, a lower limit value (hereinafter referred to as an emission amount lower limit value) of a range that enables suitable light control is −10 EV for the flash 1 and is −13 EV for the flash 2.

FIG. 6A, FIG. 6B, and FIG. 6C are views showing examples of images of a person in a dark indoor space picked up by flash photographing.

FIG. 6A shows an image picked up with a proper emission amount and proper exposure as intended by a user.

In the meantime, if an image is picked up without considering the emission amount lower limit value, the image as shown in FIG. 6A may not be photographed. For example, that is a case where the camera sends the emission instruction value that indicates the emission amount to obtain proper exposure on calculation to the flash but the emission instruction value is less than the emission amount lower limit value for the flash. In such a case, since the flash cannot control the light suitably and emits light more brightly than the ideal emission amount, an image in which the exposure of the object becomes over as shown in FIG. 6B is photographed. In this case, the background to which the flash light does not reach is properly exposed.

As compared with this, Japanese Laid-Open Patent Publication (Kokai) No. 2005-221641 (JP 2005-221641A) discloses the technique that fixes the emission instruction value sent to the flash to the emission lower limit value when the emission instruction value calculated in the camera is equal to or less than the emission lower limit value of the flash during flash photographing using a close-up lens. On the other side, an aperture value and sensitivity (ISO speed) given to an image signal obtained from an image sensor are adjusted. This reduces overexposure of the object.

However, since the method of the above-mentioned publication adjusts the aperture value and the ISO speed so as to reduce overexposure of an object, an image in which exposure of background does not meet user's intention may be photographed.

Specifically, since the method of the above-mentioned publication fixes the emission instruction value sent to the flash to the emission lower limit value, the flash is able to control the light suitably, and as a result, the flash emits light with the suitable brightness depending on the emission instruction value from the camera.

In the meantime, exposure values (an aperture value and ISO speed) other than the emission amount are adjusted to be darker considering the additional emission amount from the ideal emission amount calculated according to the emission instruction value. Accordingly, the exposure of the background to which the flash light does not reach becomes under as shown in FIG. 6C.

Moreover, the emission amount lower limit value differs for each flash as shown by the graphs in FIG. 5A and FIG. 5B showing the light control performances of the flashes 1 and 2. Accordingly, when a camera sets a uniform emission amount lower limit value, the following two problems may occur.

(1) When an actual emission lower limit value of a flash is higher than the uniform emission amount lower limit value, the technique of the above-mentioned publication becomes ineffective and an image as shown in FIG. 6B may be obtained.

(2) When an actual emission lower limit value of a flash is lower than the uniform emission amount lower limit value, an image as shown in FIG. 6C may be obtained, even though a light control performance of the flash allows photographing of a proper exposure image as shown in FIG. 6A. That is, the light control performance of the flash may not be utilized at the maximum.

SUMMARY OF THE INVENTION

The present invention provides a light emitting apparatus, an image pickup apparatus, control methods therefor, storage media storing control programs therefor, and an image pickup system, which are capable of photographing a proper exposure image by utilizing light control performance of a flash at the maximum even in photographing that needs to keep a flash emission amount to a minute amount.

Accordingly, a first aspect of the present invention provides a light emitting apparatus connected with an image pickup apparatus communicably, the light emitting apparatus including a receiving unit configured to receive a first request from the image pickup apparatus, and a first sending unit configured to send information about a first emission amount lower limit value that is settable by the image pickup apparatus as an emission amount lower limit value to the image pickup apparatus in a case where the receiving unit receives the first request from the image pickup apparatus in a first emission mode in which light is emitted at a time of photographing with an emission amount set by the image pickup apparatus in a case where automatic light control is performed.

Accordingly, a second aspect of the present invention provides an image pickup apparatus that has an image sensor and is connected to a light emitting apparatus communicably, the image pickup apparatus including a first requesting unit configured to request information about a first emission amount lower limit value that is settable by the image pickup apparatus as an emission amount lower limit value from the light emitting apparatus in a first emission mode in which the light emitting apparatus emits light at a time of photographing with an emission amount set in a case where automatic light control is performed, and a first lower limit value setting unit configured to set the first emission amount lower limit value based on the information about the first emission amount lower limit value sent from the light emitting apparatus in response to the request by the first requesting unit.

Accordingly, a third aspect of the present invention provides an image pickup system including an image pickup apparatus and a light emitting apparatus connected with the image pickup apparatus communicably. The light emitting apparatus includes a sending unit configured to send information about a first emission amount lower limit value that is settable by the image pickup apparatus as an emission amount lower limit value to the image pickup apparatus in a case where a request from the image pickup apparatus is received in a first emission mode in which light is emitted at a time of photographing with an emission amount set by the image pickup apparatus in a case where automatic light control is performed. The image pickup apparatus includes an obtaining unit configured to obtain model information about the light emitting apparatus from the light emitting apparatus, a specifying unit configured to specify whether a type of the light emitting apparatus is a first type that supports communication of information about the first emission amount lower limit value or a second type that does not support the communication from the obtained model information, and a lower limit value setting unit configured to request the information about the first emission amount lower limit value from the light emitting apparatus and to set the first emission amount lower limit value based on the information about the first emission amount lower limit value sent from the light emitting apparatus in a case where the light emitting apparatus is specified as the first type, and to set the first emission amount lower limit value to a predetermined value beforehand set in a case where the light emitting apparatus is specified as the second type.

Accordingly, a fourth aspect of the present invention provides a control method for a light emitting apparatus connected with an image pickup apparatus communicably, the control method including a receiving step of receiving a request from the image pickup apparatus, and a sending step of sending information about a first emission amount lower limit value that is settable by the image pickup apparatus as an emission amount lower limit value to the image pickup apparatus in a case where the request is received from the image pickup apparatus in a first emission mode in which light is emitted at a time of photographing with an emission amount set by the image pickup apparatus in a case where automatic light control is performed.

Accordingly, a fifth aspect of the present invention provides a control method for an image pickup apparatus that has an image sensor and is connected to a light emitting apparatus communicably, the control method including a requesting step of requesting information about a first emission amount lower limit value that is settable by the image pickup apparatus as an emission amount lower limit value from the light emitting apparatus in a first emission mode in which the light emitting apparatus emits light at a time of photographing with an emission amount set in a case where automatic light control is performed, and a setting step of setting the first emission amount lower limit value based on the information about the first emission amount lower limit value sent from the light emitting apparatus in response to the request.

Accordingly, a sixth aspect of the present invention provides a non-transitory computer-readable storage medium storing a control program causing a computer to execute the control method of the fourth aspect.

Accordingly, a seventh aspect of the present invention provides a non-transitory computer-readable storage medium storing a control program causing a computer to execute the control method of the fifth aspect.

According to the present invention, a proper exposure image is photographed by utilizing light control performance of a flash to the maximum even in photographing that needs to keep a flash emission amount to a minute amount.

Further features of the present invention will become apparent from the following description of exemplary embodiments with reference to the attached drawings.

DESCRIPTION OF THE EMBODIMENTS

Figure 1:
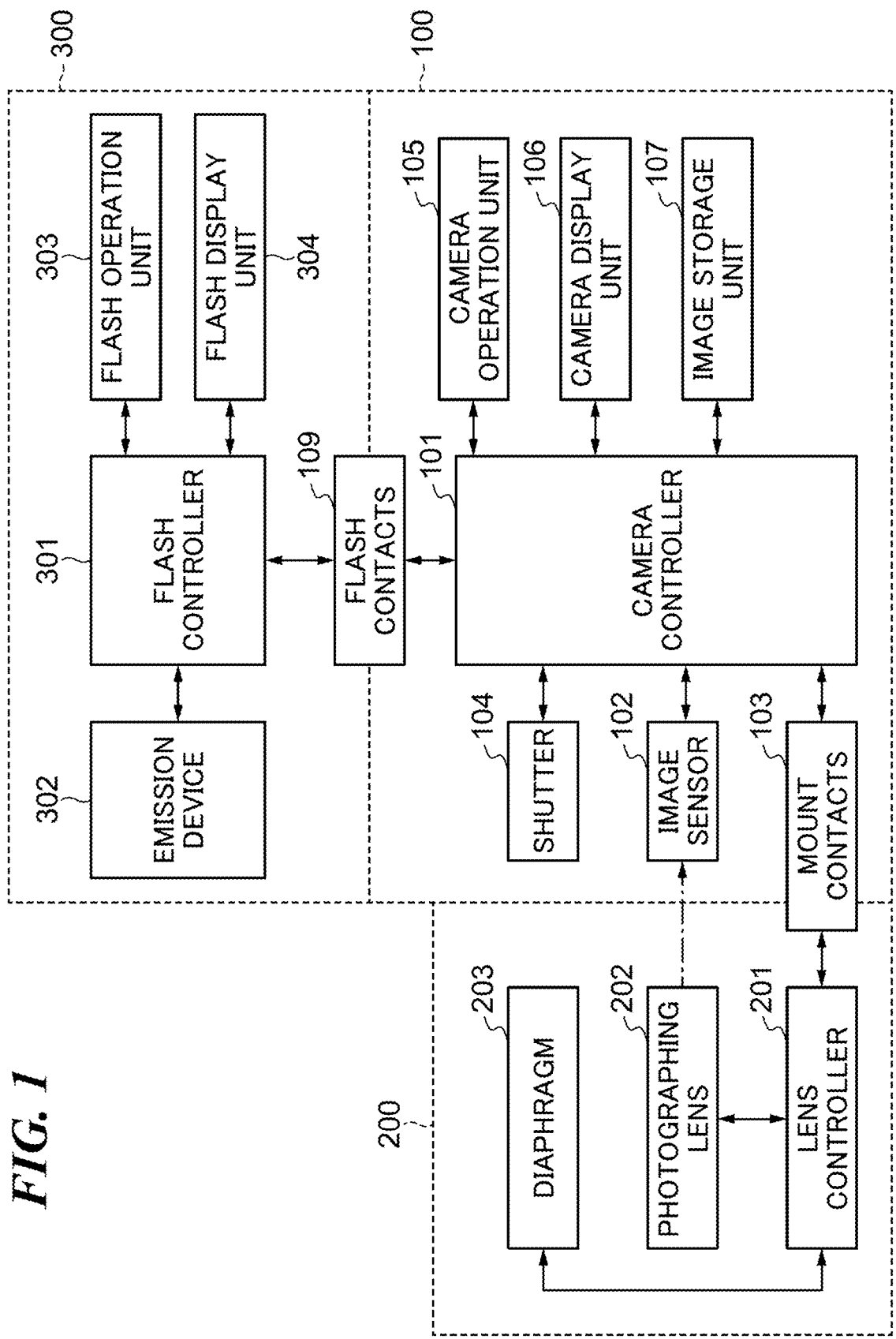
FIG. 1 is a block diagram showing a configuration example of an image pickup system according to the present invention.

Hereafter, embodiments according to the present invention will be described in detail by referring to the drawings.

FIG. 1 is a block diagram showing a configuration example of an image pickup system according to the present invention.

As shown in FIG. 1, the image pickup system consists of a camera 100, lens 200, and flash 300.

The exchangeable lens 200 is attached to the camera 100, and is electrically connected to the camera 100 through mount contacts 103 of the camera 100.

The exchangeable flash 300 is also attached to the camera 100, and is electrically connected to the camera 100 through flash contacts 109 of the camera 100.

Hereinafter, an internal configuration of the camera 100 will be described.

A camera controller 101 is a microcomputer that controls actions of sections of the camera 100.

An image sensor 102 converts light, which is entered from an object through a below-mentioned photographing lens 202 of the lens 200, into an electrical signal, generates image data, and outputs it to the camera controller 101.

A focal-plane shutter (hereinafter referred to as a shutter) 104 is arranged between the image sensor 102 and the photographing lens 202, and acts in response to an instruction from the camera controller 101. The shutter 104 consists of a first curtain and a second curtain. When the first curtain runs, the shutter 104 opens and exposure of the image sensor 102 starts. When the second curtain runs, the shutter 104 closes and the exposure of the image sensor 102 finishes.

A camera operation unit 105 detects user's operation instructions to operation members (not shown in FIG. 1), such as a release button, switch, dial, and connection device, that are mounted on the camera 100, and sends signals corresponding to the operation instructions to the camera controller 101. For example, the camera operation unit 105 outputs a SW1 signal to the camera controller 101 when a user half presses the release button, and outputs a SW2 signal to the camera controller 101 when the user fully presses the release button.

A camera display unit 106 displays photographing information and a photographed image according to an instruction from the camera controller 101.

The camera controller 101 controls actions of the camera 100 on the basis of the output signal from the camera operation unit 105. When the SW1 signal is output from the camera operation unit 105, the camera controller 101 drives the image sensor 102 to photograph and controls AF and AE actions. The AE action is performed to decide shutter speed, an aperture value, and ISO speed that are used at the time of photographing on the basis of a photometry result obtained by repeating photometry control that measures luminance of an object from a photographed result of the image sensor 102. The shutter speed, aperture value, and ISO speed that are used at the time of photographing are collectively called exposure control values. The decided exposure control values are displayed on a screen of the camera display unit 106. Moreover, the AF action is performed to adjust a focus state by driving the photographing lens 202 on the basis of a result of AF calculation that detects the focus state of the photographing lens 202 from a photographed result of the image sensor 102. In the meantime, when the SW2 signal is output from the camera operation unit 105, the camera controller 101 drives a below-mentioned diaphragm 203 of the lens 200, sets sensitivity (ISO speed) of the image sensor 102, and controls the shutter 104 to expose the image sensor 102 to the light. The camera controller 101 controls to display a photographed image on the screen of the camera display unit 106 according to image data obtained from the image sensor 102 and to write the image data into an image storage unit 107.

Next, an internal configuration of the lens 200 will be described.

A lens controller 201 is a microcomputer that controls actions of sections of the lens 200. The photographing lens 202 is constituted by a plurality of lenses, and forms an object image on the image sensor 102. Furthermore, the photographing lens 202 is provided with the diaphragm 203 for adjusting a light amount and includes a focusing lens (not shown) for adjusting focus.

The lens controller 201 adjusts the focus and the light amount taken into the camera 100 according to an instruction from the camera controller 101 through the mount contacts 103.

Hereinafter, an internal configuration of the flash 300 will be described.

A flash controller 301 is a microcomputer that controls actions of sections of the flash 300. The camera controller 101 is communicable with the camera controller 101 through the flash contacts 109, receives the emission control instruction and camera information from the camera 100, and sends strobe information to the camera 100. The emission device 302 consists of a discharge tube, an emission capacitor, an emitting circuit, and a light-emitting optical system that are not shown in FIG. 1. A flash operation unit 303 is provided with operation members, such as a button and a dial (not shown in FIG. 1), that are attached to the flash 300 and are operated by a user, detects operation instructions by the user through the operating members, and sends signals according to the operation instructions to the flash controller 301. A flash display unit 304 displays an emission mode etc. according to instructions from the flash controller 301.

The emission device 302 drives the emitting circuit according to instructions from the flash controller 301 so as to emit light by releasing energy charged by the emission capacitor to the discharge tube, and to irradiate an object through the light-emitting optical system. An emission amount may be set through the flash operation unit 303, or may be obtained from the camera controller 101 by communication through the flash contacts 109. The flash controller 301 controls the emission device 302 so as to emit light with a predetermined emission amount in synchronization with the photographing action of the camera 100 according to the instruction from the camera controller 101 through the flash contacts 109.

Hereinafter, actions of the image pickup system in FIG. 1 according to the first embodiment will be described by referring to FIG. 2.

Figure 2:
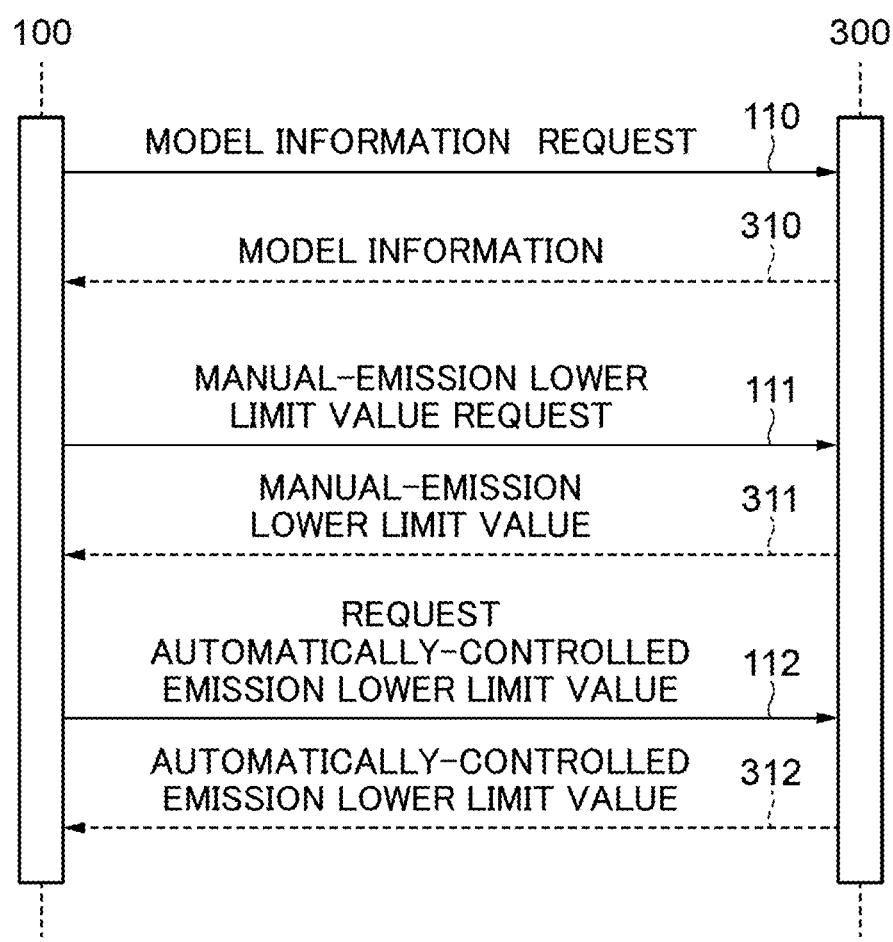
FIG. 2 is a view showing a communication sequence between a camera and a flash shown in FIG. 1 according to a first embodiment.

FIG. 2 is a view showing a communication sequence between the camera 100 and the flash 300 shown in FIG. 1 according to the first embodiment. This communication is performed through the flash contacts 109.

The camera controller 101 sends a model information request 110 to the flash 300 first. When receiving the model information request 110, the flash controller 301 sends model information 310 to the camera controller 101. By receiving this model information 310, the camera controller 101 is able to specify a type of the flash 300 that is attached.

Next, the camera controller 101 sends a manual-emission lower limit value request 111 to the flash 300. When receiving the manual-emission lower limit value request 111, the flash controller 301 sends a manual-emission lower limit value (a second emission amount lower limit value) 311 to the camera controller 101. The manual-emission lower limit value 311 represents the minimum emission amount that a user is settable in a manual emission mode (a second emission mode) in which the emission amount of the flash 300 at the time of photographing by the camera 100 is set by the user. An emission amount lower than the manual-emission lower limit value 311 is not displayed in a user-selectable manner on the camera display unit 106 and the flash display unit 304 in the manual emission mode, so that a user cannot set it up.

Next, when deciding that the type of the flash 300 specified on the basis of the received model information 310 supports communication of information about an automatically-controlled emission lower limit value, the camera controller 101 sends an automatically-controlled emission lower limit value request 112 to the flash 300. When receiving the automatically-controlled emission lower limit value request 112, the flash controller 301 sends an automatically-controlled emission lower limit value (a first emission amount lower limit value) 312 to the camera controller 101. The automatically-controlled emission lower limit value 312 represents the minimum emission amount that the camera 100 is settable in an automatic light control mode (a first emission mode). In addition, an action of this automatic light control mode will be described later.

Since the emission amount of the flash 300 at the time of photographing is set by a user's operation in the manual emission mode, a numeric value range of the emission amount that is settable by a user is necessarily displayed on at least one of the camera display unit 106 and the flash display unit 304. The numeric value range shall be limited to a range in which a user usually sets up as the emission amount because display spaces of the camera display unit 106 and the flash display unit 304 are not so wide.

In the meantime, since the camera 100 sets the emission amount of the flash 300 at the time of photographing in the automatic light control mode, it is unnecessary to notify a user of the numeric value range of the settable emission amount. Accordingly, since the numeric value range is not restricted by the specifications of the camera display unit 106 and the flash display unit 304, the lower limit of the numeric value range is decided depending on the light control performance of the flash 300. That is, the automatically-controlled emission lower limit value 312 is set so as to be lower than the manual-emission lower limit value 311.

Figure 5A:
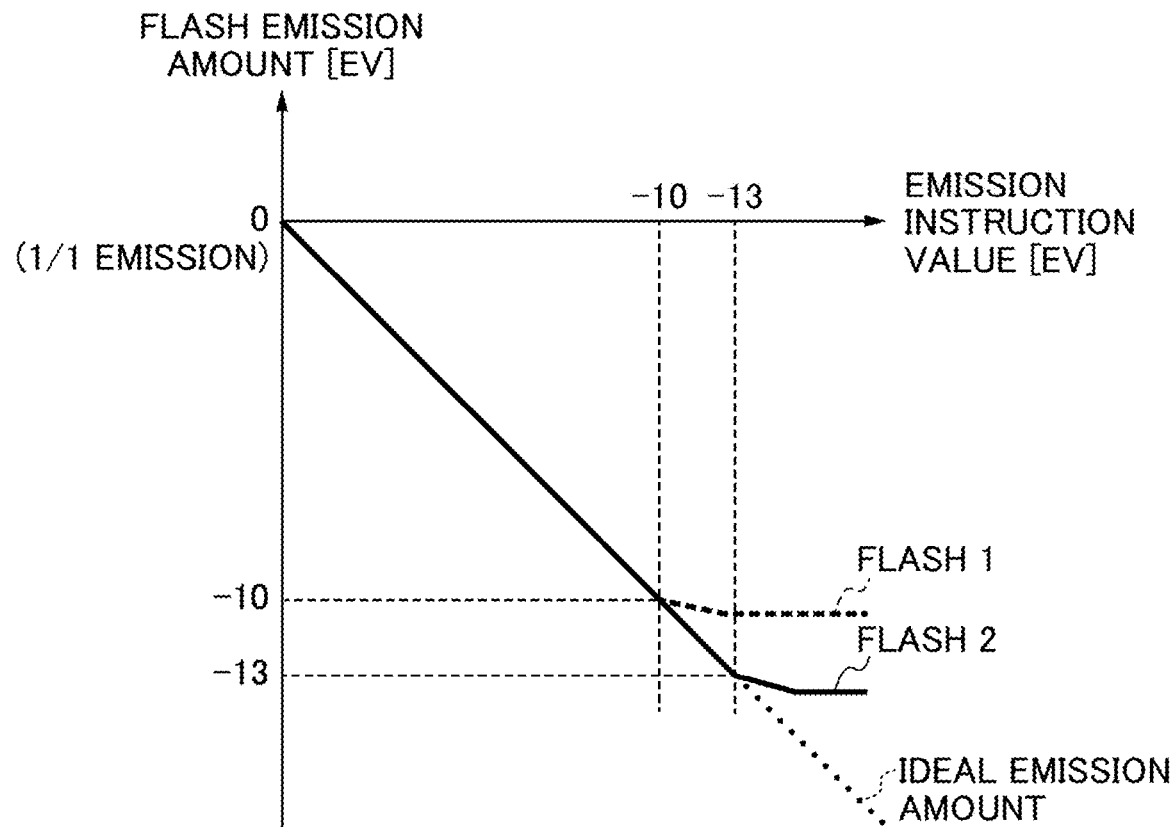
FIG. 5A and FIG. 5B are graphs showing examples of relationship between an emission instruction value from the camera and an emission amount of the flash.
Figure 5B:
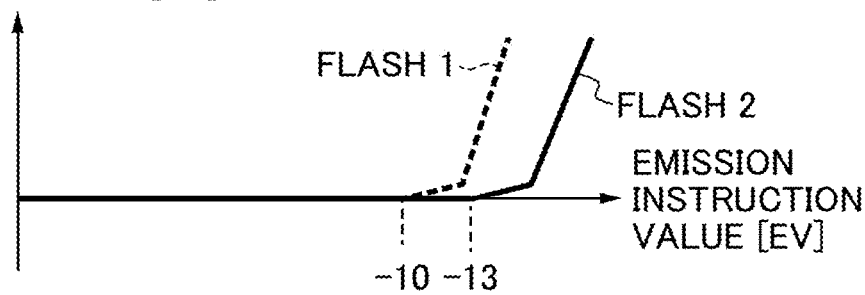
Figure 6A:
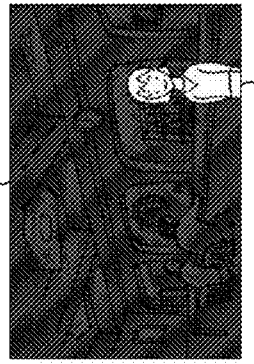
FIG. 6A, FIG. 6B, and FIG. 6C are views showing examples of images of a person in a dark indoor space picked up by flash photographing.
Figure 6B:
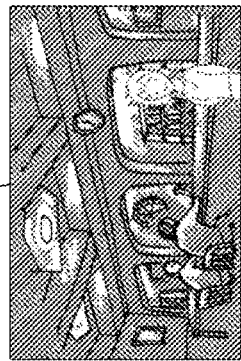
Figure 6C:
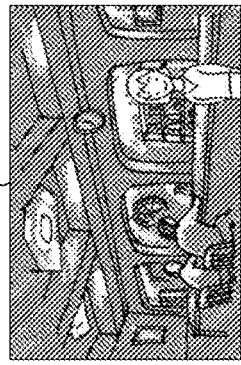

In addition, the automatically-controlled emission lower limit value 312 is equal to or more than the minimum limit value and is less than the manual-emission lower limit value 311. The minimum limit value is the lowest emission amount that is settable on the basis of the light control performance of the flash 300. However, the automatically-controlled emission lower limit value 312 is preferably set to this minimum limit value. If the automatically-controlled emission lower limit value 312 is set higher than the minimum limit value, an image as shown in FIG. 6C may be obtained, even though the light control performance of the flash 300 allows photographing of a proper exposure image as shown in FIG. 6A. For example, when the flash 300 has the same light control performance as the flash 2 in FIG. 5B, the manual-emission lower limit value 311 shall be a value (−7 EV) of the relative light amount that is $1/128$ of the emission amount of the full emission. In the meantime, the automatically-controlled emission lower limit value shall be the minimum limit value (−13 EV) of the relative light amount that is the lowest emission amount that is settable on the basis of the light control performance of the flash 300 and is $1/8192$ of the emission amount of the full emission.

In the above description, the manual-emission lower limit value 311 is set to $1/128$ of the emission amount of the full emission and the automatically-controlled emission lower limit value 312 is set to $1/8192$ of the emission amount of the full emission so that these lower limit values become integers in the EV notation. However, the automatically-controlled emission lower limit value 312 is not necessary to be an integer in the EV notation. For example, when the emission amount is adjusted in detail, a step width of the emission amount control may be $1/4$ or $1/8$ in the EV notation. When the emission amount is adjusted in such a step width, although there is no problem even if a value that is not an integer in the EV notation is used as the automatically-controlled emission lower limit value 312, a value that is not an integer in the EV notation is not suitable for the manual-emission lower limit value 311. Specifically, when the lower limit value that is decided by the light control performance of the flash 300 is −7+$1/8$ EV in the EV notation ($9/1024$ of the emission amount of the full emission), there is no problem even if this lower limit value is set as the automatically-controlled emission lower limit value 312 that is unnecessary to be displayed. In the meantime, if such a value that is not an integer in the EV notation is set as the manual-emission lower limit value that is necessary to be displayed, displayed characters needs wider space than the above-mentioned case where the lower limit value is set to −7 EV ($1/128$ of the emission amount of the full emission). This may be a problem.

The communication in the communication sequence in FIG. 2 described above is an example of the communication performed between the camera 100 and the flash 300, various communications are performed other than the described example. These communications are executed at predetermined timings, such as a photographing timing and a detection timing of attaching of the flash by the camera controller 101.

In addition, when a flash (hereinafter referred to an unsupported flash) of a type that does not support the communication of information about the automatically-controlled emission lower limit value is attached, the camera 100 sends the model information request 110 to the unsupported flash first as with the case where the flash 300 is attached. The camera controller 101 specifies that the type of the unsupported flash does not support the communication of information about the automatically-controlled emission lower limit value on the basis of the model information sent from the unsupported flash in response to this request. When specifying as such, the camera controller 101 sets the emission amount lower limit value that is settable to the unsupported flash in the automatic light control mode to a predetermined value beforehand set without sending the automatically-controlled emission lower limit value request 112 to the unsupported flash. The details will be described by referring to FIG. 4.

An action of a flash photographing process concerning this embodiment will be described using a flowchart shown in FIG. 3. This process is executed when the camera controller 101 reads a program stored in a ROM (not shown) in the camera 100 under the condition where the automatic light control mode and an ISO-speed automatic setting mode are set up in the camera 100. In the automatic light control mode, the flash photographing is performed after calculating the emission amount (a main emission amount) that enables the flash photographing with proper exposure on the basis of the reflected light received by the image sensor at the time of preliminary emission. Moreover, in the ISO-speed automatic setting mode, the ISO speed is automatically set up by an AE operation.

First, when the SW1 signal becomes an ON state (YES in the step S300), the camera controller 101 proceeds with the process to step S301 and performs the AF and AE operations. That is, the focus state of the photographing lens 202 is adjusted and the exposure control values including the ISO speed are decided in a state where the flash attached to the camera 100 does not emit.

Next, when the SW2 signal becomes an ON state (YES in the step S302), the camera controller 101 proceeds with the process to step S303. In the step S303, the camera controller 101 controls the image sensor 102 during the preliminary emission of the flash 300 and calculates the flash emission amount at the time of photographing (the main emission amount) from the obtained information. In addition, the exposure control values decided in the step S301 are used at the time of the preliminary emission.

In step S304, the camera controller 101 determines whether an ISO-speed shift mode is set. As a result of the determination, when the ISO-speed shift mode is set, the process proceeds to step S305. When the ISO-speed shift mode is not set, the process proceeds to step S309. In the ISO-speed shift mode (an emission amount reduction mode), the ISO speed is shifted in steps S304 through S308 mentioned later in order to reduce the emission amount of the flash attached to the camera 100. Moreover, the ISO-speed shift mode is set by a user's operation.

In the step S305, the camera controller 101 executes an emission-amount-lower-limit-value decision process that decides the lower limit of the emission amount that is settable to the attached flash in the automatic light control mode.

Figure 3:
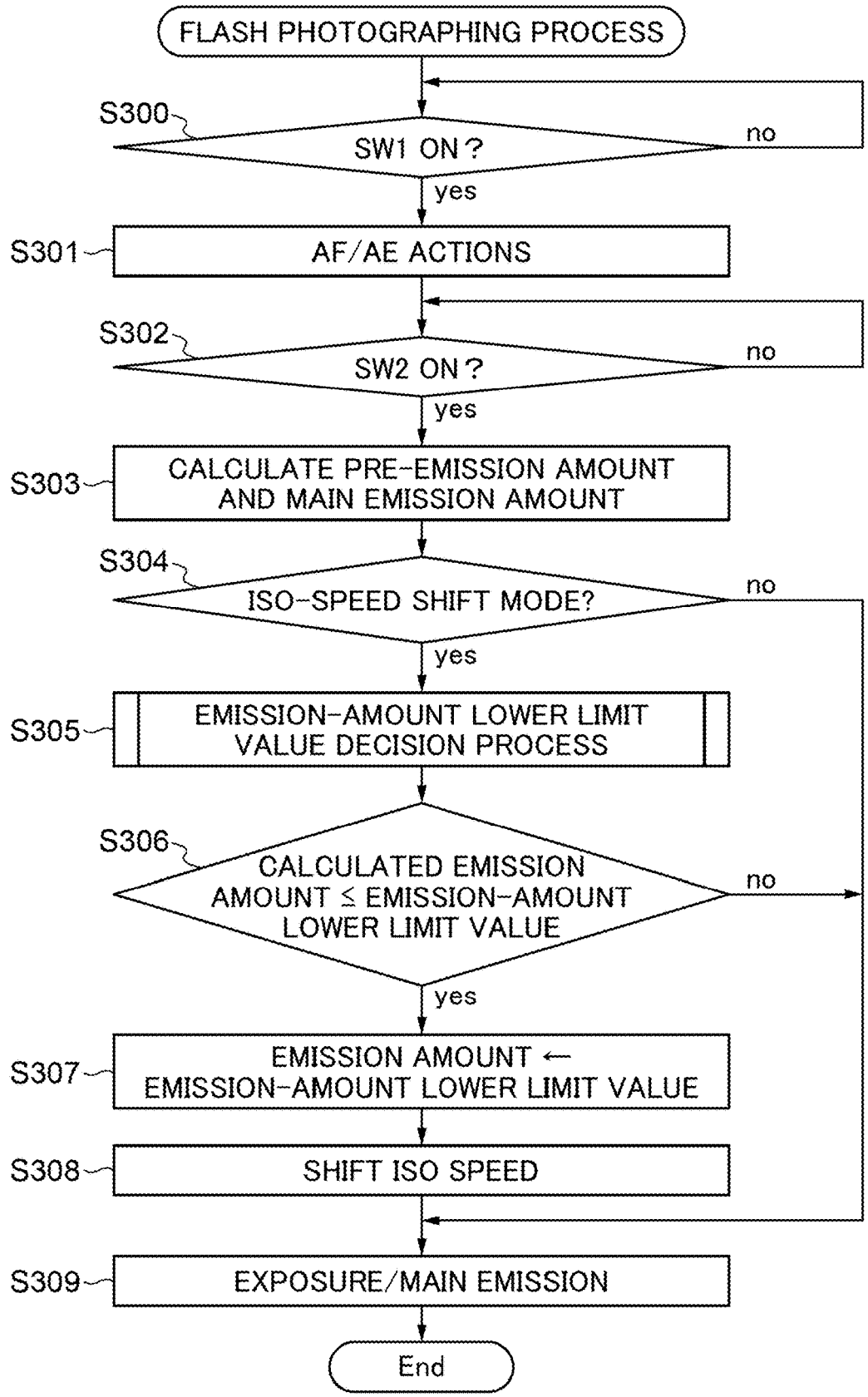
FIG. 3 is a flowchart showing procedures of a flash photographing process according to the first embodiment.
Figure 4:
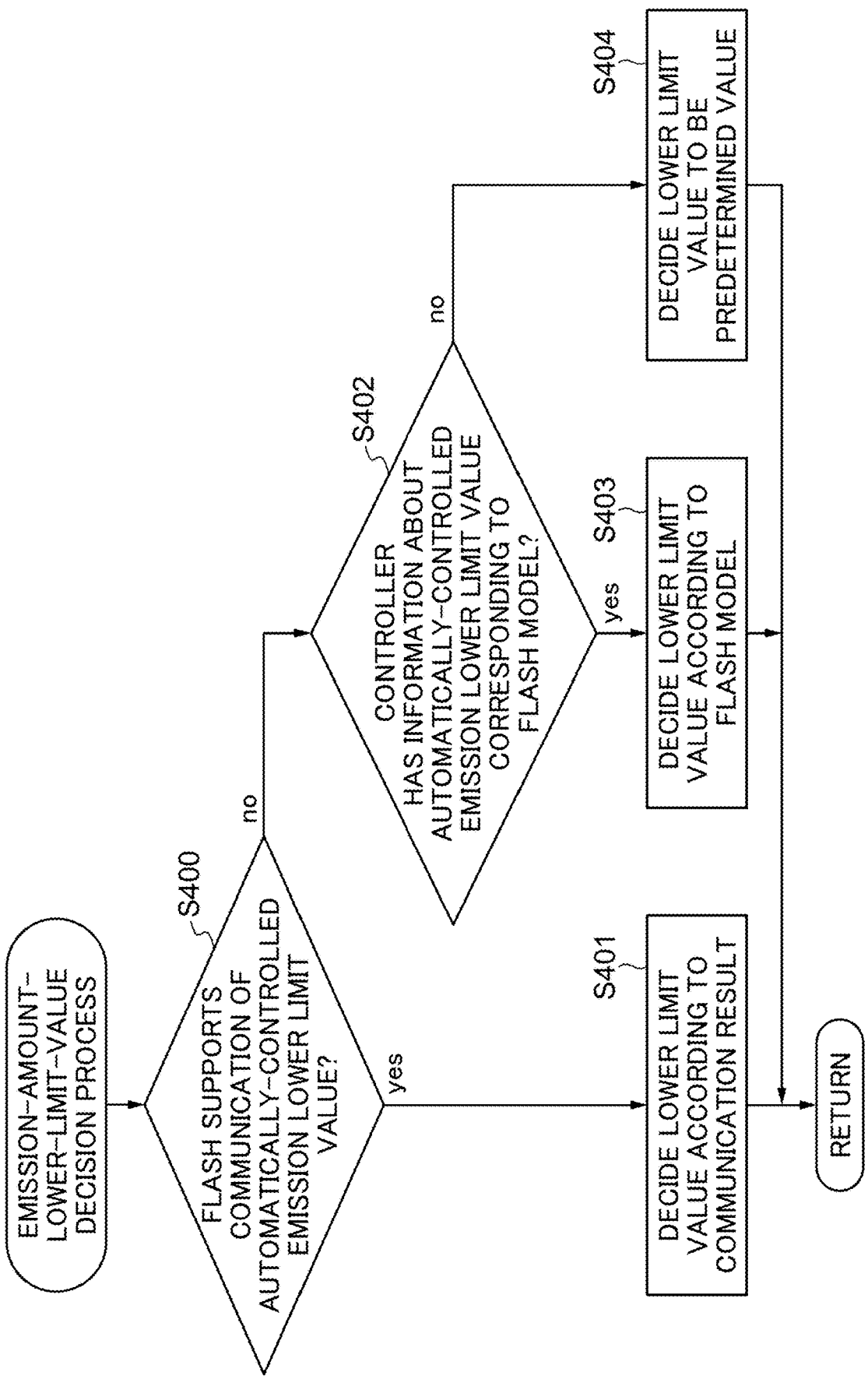
FIG. 4 is a flowchart showing a subroutine of an emission-amount-lower-limit-value decision process in step S305 in FIG. 3.

FIG. 4 is a flowchart showing a subroutine of the emission-amount-lower-limit-value decision process in the step S305 in FIG. 3.

In step S400, the camera controller 101 determines whether the attached flash supports the communication of information about the automatically-controlled emission lower limit value. As a result, when the flash supports the communication, i.e., when the flash 300 is attached, the process proceeds to step S401. When the flash does not support the communication, i.e., when the unsupported flash is attached, the process proceeds to step S402.

The camera controller 101 decides the automatically-controlled emission lower limit value 312 obtained from the flash 300 as the first emission amount lower limit value that is settable in photographing in the automatic light control mode in the step S401, and finishes the emission-amount-lower-limit-value decision process.

In the step S402, the camera controller 101 determines whether the camera controller 101 has lower limit information corresponding to the model information obtained from the unsupported flash. As a result of the determination, when the camera controller 101 has the lower limit information, the process proceeds to step S403. When the camera controller 101 does not have the lower limit information, the process proceeds to step S404. In the description, the lower limit information shows the minimum limit value of the settable emission amount that is decided for every flash model according to its light control performance. For example, the lower limit information shows −10 EV for the flash 1 of the graph in FIG. 5B.

The camera controller 101 decides the first emission amount lower limit value that is settable in photographing in the automatic light control mode on the basis of the lower limit information corresponding to the model information obtained from the unsupported flash in the step S403, and finishes this process. For example, when the camera controller 101 has the lower limit information and model information about the flash 1 in the graph in FIG. 5B and when the model information about the unsupported flash coincides with the model information of the flash 1, the first emission amount lower limit value is decided as −10 EV in the step S403.

The camera controller 101 decides a predetermined value that is a uniform value independent of the model information of the unsupported flash as the first emission amount lower limit value that is settable in photographing in the automatic light control mode in the step S404, and finishes this process.

Referring back to FIG. 3, when the emission-amount-lower-limit-value decision process in the step S305 is finished, the process proceeds to step S306.

In the step S306, the camera controller 101 determines whether the flash emission amount calculated in the step S303 is equal to or less than the emission amount lower limit value decided in the step S305.

When the calculated flash emission amount is equal to or less than the emission amount lower limit value decided in the step S305, the process proceeds to step S307. In the meantime, when the calculated flash emission amount is more than the emission amount lower limit value decided in the step S305, the process proceeds to the step S309.

In the step S307, the camera controller 101 sets the main emission amount to the emission amount lower limit value decided in the step S305.

In step S308, the camera controller 101 shifts the ISO speed at the time of photographing on the basis of the difference between the flash emission amount calculated in the step S303 and the flash emission amount set in the step S307. For example, when the flash emission amount calculated in the step S303 is −11 EV and the flash emission amount set in the step S307 is −10 EV, the main emission amount brightens by 1 EV. When the ISO speed is lowered by 1 EV in response to this, an object is photographed at the proper exposure.

The camera controller 101 controls the flash 300, image sensor 102, shutter 104, etc., to execute the exposure operation by emitting the attached flash (the main emission) in the step S309, and finishes this process.

As mentioned above, according to the first embodiment, when the flash 300 is attached to the camera 100, the automatically-controlled emission lower limit value 312 obtained from the flash 300 is decided as the emission amount lower limit value in the step S305. In the meantime, when the unsupported flash is attached to the camera 100, the emission amount lower limit value is decided in the step S305 on the basis of the model information obtained from the unsupported flash. That is, the emission amount lower limit value that is settable in the automatic light control mode is decided for every flash attached to the camera 100. This enables the emission control so as to utilize the emission performance of the flash to the maximum at the time of the flash photographing.

Next, a case where the camera 100 is further provided with a continuous-photographing prioritized automatic light control mode will be described as a second embodiment of the present invention.

The continuous-photographing prioritized automatic light control mode prevents missing of emission due to running-out of battery for flash emissions by reducing the main emission amount at the time of continuous photographing so as to increase the number of continuous flash emissions.

That is, the ISO speed set in the ISO-speed automatic setting mode and in the continuous-photographing prioritized automatic light control mode is larger than the ISO speed in the automatic light control mode (namely, the ISO speed decided in the step S301) by a predetermined amount. Moreover, the main emission amount calculated by the preliminary emission in the continuous-photographing prioritized automatic light control mode becomes lower than the value calculated in the step S303 in FIG. 3.

A flash photographing process in case where the continuous-photographing prioritized automatic light control mode and the ISO-speed automatic setting mode are set is the same as that in FIG. 3 basically. However, the camera controller 101 sets the ISO-speed shift mode after being the SW2 signal in the ON state in the step S302 and calculating the main emission amount with the preliminary emission in the step S303, and proceeds with the process to the step S305 after this setting. Moreover, the camera controller 101 notifies the user that the ISO-speed shift mode has been set through the camera display unit 106.

In the continuous-photographing prioritized automatic light control mode, a value lower than the value of the main emission amount calculated in the automatic light control mode is calculated as mentioned above. Accordingly, a possibility that the calculated main emission amount will become lower than the minimum limit value of the settable emission amount that is decided according to its light control performance becomes higher than that in the automatic light control mode. Accordingly, it is not determined whether the ISO-speed shift mode is set by a user's operation, but the camera controller 101 sets the ISO-speed shift mode for itself in the continuous-photographing prioritized automatic light control mode as mentioned above. This raises the probability of photographing an object at proper exposure.

Although the preferable embodiments of the present invention have been described above, the present invention is not limited to these embodiments. Various deformations and changes are available within the scope of the invention.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-121070, filed Jun. 26, 2018, which is hereby incorporated by reference herein in its entirety.

What is claimed is:

1. A light emitting apparatus communicably connected with an image pickup apparatus, comprising at least one processor that functions, according to at least one program stored in a memory, as units comprising:
   a receiving unit configured to receive a first request from the image pickup apparatus;
   a first sending unit configured to send information about a first emission amount lower limit value that is settable by the image pickup apparatus as an emission amount lower limit value to the image pickup apparatus in a case where the receiving unit receives a first request from the image pickup apparatus in a first emission mode in which light is emitted at a time of photographing with an emission amount set by the image pickup apparatus in a case where automatic light control is performed; and
   a second sending unit configured to send information about a second emission amount lower limit value that is settable by a user as the emission amount lower limit value to the image pickup apparatus in a case where the receiving unit receives a second request from the image pickup apparatus in a second emission mode in which light is emitted at a time of photographing with an emission amount set by the user,
   wherein the first emission amount lower limit value is lower than the second emission amount lower limit value.

2. An image pickup apparatus that has an image sensor and is communicably connected to a light emitting apparatus, comprising at least one processor that functions, according to at least one program stored in a memory, as units comprising:
   a first requesting unit configured to request information about a first emission amount lower limit value that is settable by the image pickup apparatus as an emission amount lower limit value from the light emitting apparatus in a first emission mode in which the light emitting apparatus emits light at a time of photographing with an emission amount set in a case where automatic light control is performed;
   a first lower limit value setting unit configured to set the first emission amount lower limit value based on the information about the first emission amount lower limit value sent from the light emitting apparatus in response to the request by the first requesting unit;
   a second requesting unit configured to request information about a second emission amount lower limit value that is settable by a user as an emission amount lower limit value from the light emitting apparatus in a second emission mode in which the light emitting apparatus emits light at the time of photographing with an emission amount set by the user; and
   a second lower limit value setting unit configured to set the second emission amount lower limit value based on the information about the second emission amount lower limit value sent from the light emitting apparatus in response to the request by the second requesting unit, wherein the first emission amount lower limit value is lower than the second emission amount lower limit value.

3. The image pickup apparatus according to claim 2, further comprising:
a first calculation unit configured to calculate an emission amount at the time of photographing by performing the automatic light control in the first emission mode in a state where the light emitting apparatus does not emit light and where a sensitivity of the image sensor is set to a first sensitivity;
a first determination unit configured to determine whether an emission amount reduction mode is set in the first emission mode; and
a first sensitivity setting unit configured to set the emission amount at the time of photographing to the first emission amount lower limit value and to lower the sensitivity of the image sensor at the time of photographing from the first sensitivity by difference between the emission amount calculated by the first calculation unit and the first emission amount lower limit value in a case where the first determination unit determines that the emission amount reduction mode is set and where the emission amount calculated by the first calculation unit is lower than the first emission amount lower limit value.

4. The image pickup apparatus according to claim 3, further comprising:
a second calculation unit configured to calculate an emission amount at a time of continuous photographing by performing the automatic light control while setting the sensitivity of the image sensor at a second sensitivity that is more than the first sensitivity by a predetermined amount in a third emission mode in which the light emitting apparatus emits light at the time of continuous photographing with an emission amount set in a case where the automatic light control is performed;
a mode setting unit configured to set the emission amount reduction mode in the third emission mode; and
a second sensitivity setting unit configured to set the emission amount at the time of continuous photographing to the first emission amount lower limit value and to lower the sensitivity of the image sensor at the time of continuous photographing from the second sensitivity by difference between the emission amount calculated by the second calculation unit and the first emission amount lower limit value in a case where the emission amount calculated by the second calculation unit is lower than the first emission amount lower limit value after setting the emission amount reduction mode.

5. The image pickup apparatus according to claim 2, further comprising:
an obtaining unit configured to obtain model information from the light emitting apparatus; and
a specifying unit configured to specify whether a type of the light emitting apparatus is a first type that supports communication of information about the first emission amount lower limit value or a second type that does not support the communication from the obtained model information,
wherein the first lower limit value setting unit requests the information about the first emission amount lower limit value from the light emitting apparatus and sets the first emission amount lower limit value based on the information about the first emission amount lower limit value sent from the light emitting apparatus, in a case where the light emitting apparatus is specified as the first type, and
wherein the first lower limit value setting unit sets the first emission amount lower limit value to a predetermined value beforehand set in a case where the light emitting apparatus is specified as the second type.

6. The image pickup apparatus according to claim 5, further comprising a second determination unit configured to determine whether the light emitting apparatus has lower limit information corresponding to the obtained model information in a case where the light emitting apparatus is specified as the second type,
wherein the first lower limit value setting unit sets the first emission amount lower limit value to a value based on the lower limit information in a case where the light emitting apparatus has the lower limit information, and sets the first emission amount lower limit value to a uniform value independent of the model information in a case where the light emitting apparatus does not have the lower limit information.

7. An image pickup system comprising:
a light emitting apparatus communicably connected with an image pickup apparatus, comprising at least one processor that functions, according to at least one program stored in a memory, as units comprising:
a sending unit configured to send information about a first emission amount lower limit value that is settable by the image pickup apparatus as an emission amount lower limit value to the image pickup apparatus in a case where a request from the image pickup apparatus is received in a first emission mode in which light is emitted at a time of photographing with an emission amount set by the image pickup apparatus in a case where automatic light control is performed, and send information about a second emission amount lower limit value that is settable by a user as the emission amount lower limit value to the image pickup apparatus in a case where a second request from the image pickup apparatus is received in a second emission mode in which light is emitted at a time of photographing with an emission amount set by the user, wherein the first emission amount lower limit value is lower than the second emission amount lower limit value; and
the image pickup apparatus comprising at least one processor that functions, according to at least one program stored in a memory, as units comprising:
an obtaining unit configured to obtain model information about the light emitting apparatus from the light emitting apparatus;
a specifying unit configured to specify whether a type of the light emitting apparatus is a first type that supports communication of information about the first emission amount lower limit value or a second type that does not support the communication from the obtained model information; and
a lower limit value setting unit configured to request the information about the first emission amount lower limit value from the light emitting apparatus and to set the first emission amount lower limit value based on the information about the first emission amount lower limit value sent from the light emitting apparatus in a case where the light emitting apparatus is specified as the first type, and to set the first emission amount lower limit value to a predetermined value beforehand set in a case where the light emitting apparatus is specified as the second type.

8. A control method for a light emitting apparatus communicably connected with an image pickup apparatus, the control method comprising:
receiving a request from the image pickup apparatus; and
sending information about a first emission amount lower limit value that is settable by the image pickup apparatus as an emission amount lower limit value to the image pickup apparatus in a case where the request is received from the image pickup apparatus in a first emission mode in which light is emitted at a time of photographing with an emission amount set by the image pickup apparatus in a case where automatic light control is performed, and sending information about a second emission amount lower limit value that is settable by a user as the emission amount lower limit value to the image pickup apparatus in a case where a second request from the image pickup apparatus is received in a second emission mode in which light is emitted at a time of photographing with an emission amount set by the user, wherein the first emission amount lower limit value is lower than the second emission amount lower limit value.

9. A control method for an image pickup apparatus that has an image sensor and is communicably connected to a light emitting apparatus, the control method comprising:
requesting first information about a first emission amount lower limit value that is settable by the image pickup apparatus as an emission amount lower limit value from the light emitting apparatus in a first emission mode in which the light emitting apparatus emits light at a time of photographing with an emission amount set in a case where automatic light control is performed;
setting the first emission amount lower limit value based on the information about the first emission amount lower limit value sent from the light emitting apparatus in response to the requesting of the first information;
requesting second information about a second emission amount lower limit value that is settable by a user as an emission amount lower limit value from the light emitting apparatus in a second emission mode in which the light emitting apparatus emits light at the time of photographing with an emission amount set by the user; and
setting the second emission amount lower limit value based on the information about the second emission amount lower limit value sent from the light emitting apparatus in response to the requesting of the second information,
wherein the first emission amount lower limit value is lower than the second emission amount lower limit value.

\* \* \* \* \*